(12) United States Patent
Basso et al.

(10) Patent No.: US 6,763,375 B1
(45) Date of Patent: Jul. 13, 2004

(54) METHOD FOR DEFINING AND CONTROLLING THE OVERALL BEHAVIOR OF A NETWORK PROCESSOR DEVICE

(75) Inventors: Claude Basso, Raleigh, NC (US); Anthony Matteo Gallo, Apex, NC (US); Marco C. Heddes, Raleigh, NC (US); Seeta Hariharan, Raleigh, NC (US); Sridhar Rao, Raleigh, NC (US); Sonia Kiang Rovner, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,362

(22) Filed: Apr. 11, 2000

(51) Int. Cl.[7] .............................................. G06F 13/00
(52) U.S. Cl. ....................... 709/220; 714/724; 370/254; 370/335
(58) Field of Search ................................ 709/200, 220, 709/221, 222; 379/112.05, 112.01, 111; 714/724; 370/254, 335

(56) References Cited

U.S. PATENT DOCUMENTS

| | | | |
|---|---|---|---|
| 5,715,246 A | | 2/1998 | Abdesselem et al. ....... 370/347 |
| 5,761,192 A | | 6/1998 | Hummel ..................... 370/254 |
| 5,887,165 A | * | 3/1999 | Martel et al. ................ 713/100 |
| 5,914,957 A | | 6/1999 | Dean et al. .................. 370/438 |
| 6,092,123 A | * | 7/2000 | Steffan et al. ................. 710/8 |
| 6,122,719 A | * | 9/2000 | Mirsky et al. ................ 712/15 |
| 6,404,752 B1 | * | 6/2002 | Allen et al. .................. 370/335 |
| 6,539,425 B1 | * | 3/2003 | Stevens et al. ............. 709/220 |
| 6,539,427 B1 | * | 3/2003 | Natarajan et al. ........... 709/224 |
| 6,640,322 B1 | * | 10/2003 | Schulz ....................... 714/724 |

OTHER PUBLICATIONS

C. Salisbury et al., "Distributed, Dynamic Control of Circuit–Switched Banyan Networks", Parallel Processing Symposium, Mar. 30, 1998, pp. 156–161, ISBN: 0–8186–8404–6
PCT International Search Report dated 12/20/2001.

* cited by examiner

Primary Examiner—Wen Tai Lin
(74) Attorney, Agent, or Firm—Scully, Scott, Murphy & Presser PC (57) ABSTRACT

A system and method for controlling overall behavior of a network processor device implemented in a network processing environment servicing a communications network. The method includes steps of receiving a guided control frame including one or more control functions for configuring various functional devices within the network processor with device control parameter data; a step of forwarding one or more control functions from a received control frame to a functional device within the network processor to be configured; and, executing the control functions as specified in the control frame. A novel control frame data structure and communications infrastructure is implemented whereby any network processor device operating in a distributed network processing environment may be controlled in accordance with executed control functions and device control parameter data.

25 Claims, 9 Drawing Sheets

Incoming Loop

- 310
- 312 Incoming Frame Received by GFH [A]
- 314 Frame Processed by Guided Frame Processor (Box A in Guided Frame Processor Flow)
- 316 Valid Frame?
  - No → 318 Discard Frame → 320 Processor Idle
  - Yes → 322 Response or Request?
    - Request → 326 Check Target Blade in Frame → 328 Present Blade Only?
      - No → 330 To Box A in Alternative Processing Flow Chart [B]
      - Yes → 333 Ingress or Egress? [C]
        - Ingress → 338 Did Frame Come From Ingress or Egress?
          - Ingress → 342 To Box A in Guided Frame Processing Flow Chart
          - Egress → 345 Frame Entered From Wrong Side, Route to Correct Side
        - Egress → 336 Did Frame Come From Ingress or Egress?
          - Ingress → 345 Frame Entered From Wrong Side, Route to Correct Side
          - Egress → 340 To Box A in Guided Command Processor Flow
    - Response → 324 To Box A in Guided Frame Processor Flow Chart (FIG. 9)

FIG. 9

Guided Frame Processor

METHOD FOR DEFINING AND CONTROLLING THE OVERALL BEHAVIOR OF A NETWORK PROCESSOR DEVICE

BACKGROUND OF THE INVENTION

1. Field of the Invention

This invention relates generally to network processor devices, and more specifically to an improved method for defining and controlling the overall behavior of a network processor.

2. Discussion of the Prior Art

In today's networked world, bandwidth is a critical resource. Increasing network traffic, driven by the Internet and other emerging applications, is straining the capacity of network infrastructures. To keep pace, organizations are looking for better technologies and methodologies to support and manage traffic growth and the convergence of voice with data.

Today's dramatic increase in network traffic can be attributed to the popularity of the Internet, a growing need for remote access to information, and emerging applications. The Internet alone, with its explosive growth in e-commerce, has placed a sometimes insupportable load on network backbones. It is also the single most important cause of increased data traffic volumes that exceed voice traffic for the first time. The growing demands of remote access applications, including e-mail, database access, and file transfer, are further straining networks.

The convergence of voice and data will play a large role in defining tomorrow's network environment. Currently, the transmission of data over Internet protocol (IP) networks is free. Because voice communications will naturally follow the path of lowest cost, voice will inevitably converge with data. Technologies such as Voice over IP (VoIP), Voice over ATM (VoATM), and Voice over Frame Relay (VoFR) are cost-effective alternatives in this changing market. However, to make migration to these technologies possible, the industry has to ensure quality of service (QoS) for voice and determine how to charge for voice transfer over data lines. The Telecommunications Deregulation Act of 1996 further complicates this environment. This legislation will reinforce a symbiotic relationship between the voice protocol of choice, ATM, and the data protocol of choice, IP.

Integrating legacy systems is also a crucial concern for organizations as new products and capabilities become available of lowest cost, voice will inevitably converge with data. Technologies such as Voice over IP (VoIP), Voice over ATM (VoATM), and voice over Frame Relay (VoFR) are cost-effective alternatives in this changing market. However, to make migration to these technologies possible, the industry has to ensure quality of service (QoS) for voice and determine how to charge for voice transfer over data lines. The Telecommunications Deregulations Act of 1996 futher complicates this environment. This legislation will reinforce a symbiotic relationship between the voice protocol of choice, ATM, and the data protocol of choice, IP.

Intergrating legacy systems is also a crucial concern for organizations as new products and capabilities become available. To preserve their investments in existing equipment and software, organizations demand solutions that allow them to migrate to new technologies without disrupting their current operations.

Eliminating network bottlenecks continues to be a top priority for service providers. Routers are often the source of these bottlenecks. However, network congestion in general is often mis-diagnosed as a bandwidth problem and is addressed by seeking higher-bandwidth solutions. Today, manufacturers are recognizing this difficulty. They are turning to network processor technologies to manage bandwidth resources more efficiently and to provide the advanced data services, at wire speed, that are commonly found in routers and network application servers. These services include load balancing, QoS, gateways, fire walls, security, and web caching.

For remote access applications, performance, bandwidth-on-demand, security, and authentication rank as top priorities. The demand for integration of QoS and CoS, integrated voice handling, and more sophisticated security solutions will also shape the designs of future remote access network switches. Further, remote access will have to accommodate an increasing number of physical mediums, such as ISDN, Ti, E1, OC-3 through OC-48, cable, and xDSL modems.

Industry consultants have defined a network processor (herein also mentioned as an "NP") as a programmable communications integrated circuit capable of performing one or more of the following functions:

Packet classification —identifying a packet based on known characteristics, such as address or protocol;

Packet modification —modifying the packet to comply with IP, ATM, or other protocols (for example, updating the time-to-live field in the header for IP);

Queue/policy management —reflects the design strategy for packet queuing, de-queuing, and scheduling of packets for specific applications; and, Packet forwarding —transmission and receipt of data over the switch fabric and forwarding or routing the packet to the appropriate address.

Although this definition is an accurate description of the basic features of early NPs, the full potential capabilities and benefits of NPs are yet to be realized. Network processors can increase bandwidth and solve latency problems in a broad range of applications by allowing networking tasks previously handled in software to be executed in hardware. In addition, NPs can provide speed improvements through architectures, such as parallel distributed processing and pipeline processing designs. These capabilities can enable efficient search engines, increase throughput, and provide rapid execution of complex tasks.

Network processors are expected to become the fundamental network building block for networks in the same fashion that CPUs are for PCs. Typical capabilities offered by an NP are real-time processing, security, store and forward, switch fabric interface, and IP packet handling and learning capabilities. NPs target ISO layer two through five and are designed to optimize network-specific tasks.

The processor-model NP incorporates multiple general purpose processors and specialized logic. Suppliers are turning to this design to provide scalable, flexible solutions that can accommodate change in a timely and cost-effective fashion. A processor-model NP allows distributed processing at lower levels of integration, providing higher throughput, flexibility and control. Programmability can enable easy migration to new protocols and technologies, without requiring new ASIC designs.

Commensurate with design and implementation of network processor-based devices, are the data structures and methods for defining and controlling the overall behavior of an NP, to which this invention is directed.

SUMMARY OF THE INVENTION

It is an object of the invention to provide a system and method providing functionality for enabling a General Purpose Processor (GPP) that is acting as a Control Point processor (CP) in a network environment to define and control the overall behavior of a Network Processor (NP).

It is a further object of the invention to provide a method providing functionality for enabling a General Purpose Processor (GPP) that is acting as a Control Point processor (CP) in a network environment to define and control the overall behavior of a Network Processor (NP) to provide supporting functions to frame-forwarding applications running in an NP.

According to the invention, there is provided a system and method for controlling overall behavior of a network processor device implemented in a network processing environment servicing a communications network. The method includes steps of receiving a guided control frame including one or more control functions for configuring various functional devices within the network processor with device control parameter data; a step of forwarding one or more control functions from a received control frame to a functional device within the network processor to be configured; and, executing the control functions as specified in the control frame. A novel control frame data structure and communications infrastructure is implemented whereby any network processor device operating in a distributed network processing environment may be controlled in accordance with executed control functions and device control parameter data. Functional units in a network processor device particularly targeted for control include hardware Guided Frame Handler (GFH) device, and frame-forwarding applications controlled by a hardware Guided Table Handler (GTH) device.

Advantageously, the system and methodology is capable of handling and processing control frames (guided frame flows) in a variety of possible flows through a typical NP system including guided frame flows on a primary blade; guided frame flows on a secondary blade; and, guided frame flows on multiple blades in a network processing environment.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE EMBODIMENT

Figure 1:
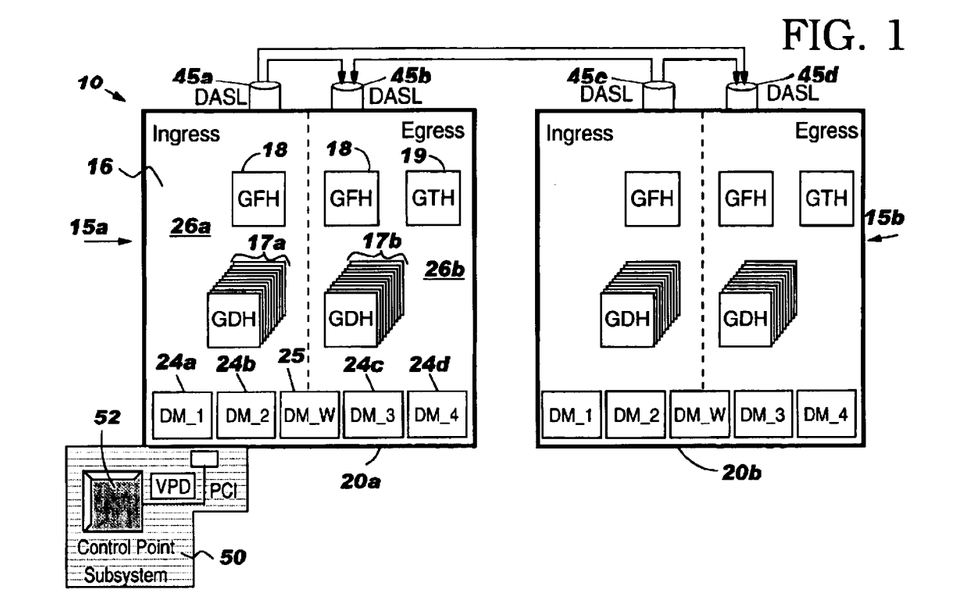
FIG. 1 illustrates an example network processing environment 100 implementing one or more network processor devices.

FIG. 1 depicts generally an example network processing environment 10 implementing one or more network processor ("NP") interface devices 15a,b for servicing a network (not shown). The preferred structure and operation of the network processor interface device 15a,b is as described in commonly-owned, co-pending U.S. patent Ser. application No. 09/384,691 filed Aug. 27, 1999 and entitled "NETWORK PROCESSOR PROCESSING COMPLEX AND METHODS", the whole contents and disclosure of which is incorporated by reference as if fully set forth herein. The example NP environment 10 illustrated in FIG. 1 provides the basis upon which the subject matter of the invention is embodied.

As depicted in FIG. 1, each NP device includes an embedded processor complex (EPC) 16 having two functional sub-assemblies: an Ingress (up-side) sub-system 26a for receiving/processing data from an external network serviced by the NP system 10 via network protocol-specific data mover interfaces (DM) 24a,b; and, an Egress (downside) sub-system 26b for transmitting data outbound to a network serviced by the NP system 10 via network protocol-specific data mover interfaces (DM) 24c,d. All frames that are passed from the Ingress to the Egress within the same NP device are passed through Data Align Synchronous Link (DASL) interfaces 45a–45d a detailed description of which may be found in co-pending U.S. patent application Ser. No. 09/330,968 filed 11 Jun. 1999 and entitled "High Speed Parallel/Serial Link for Data Communication" and incorporated by reference herein. It is understood that other equivalent type interface/link supporting high data flow rates may be implemented. Frames that need to be communicated internally from the egress side 26b back to a processor on the ingress side 26a may be communicated via a data mover wrap (DM_W) 25.

Generally, the ingress sub-assembly 26a of the NP device includes an embedded Guided Frame Handler unit 18 (GFH) and one or more General Data Handlers (GDH) processing units 17a each functioning to classify a received frame and perform a lookup to see where to forward the frame. The egress sub-assembly 26b of the NP device also includes an embedded Guided Frame Handler unit 18 (GFH), one or more Classifier/Look-up processors 17b each functioning to perform any outbound modifications or lookups, if necessary, before transmitting a frame, and additionally, includes a Guided Table Handler unit 19 (GTH). In the NP processor device, all received data traffic is handled by special Classifier/Lookup Processors referred to herein as Guided Data Handlers (GDH), and, as will be described in greater detail herein, control information used to manage the NP system 10 is handled by the Guided Frame Handler (GFH) 18. In the frame forwarding process, the Guided Tree Handler (GTH) 19 particularly implements forwarding tables.

With particular reference to FIG. 1 and the herein incorporated, co-pending U.S. patent application Ser. No. 09/384,691, the general flow of a packet or frame received at the NP device is as follows: frames received from an network, e.g., Ethernet MAC, are received at a data mover interface (DM) 24a,24b where they are identified as either normal data frames or system control frames, (Guided Frames) received from a control processor (CP) system 50. Guided frames are first generally enqueued to an Embedded Processor Complex (EPC) which comprises a plurality of picoprocessors, e.g., protocol processors, which execute logic (picocode) capable of looking at the received frame header and deciding what to do with the frame (forward, modify, filter, etc.). The EPC has access to several lookup tables, and classification hardware assists to allow the picoprocessors to keep up with the high-bandwidth requirements of the Network Processor. A classification hardware assist device in particular, is provided for classifying frames of well known frame formats. The Embedded Processing Complex (EPC) particularly provides and controls the programmability of the NP device chip and includes, among other components (such as memory, dispatcher, DM interfaces), one or more processing units which concurrently execute picocode that is stored in a common instruction memory. Each processing unit preferably includes a CLP Processing Unit core, for example, comprising a 3-stage pipeline, general purpose registers and an ALU. In operation, classification results from the classification hardware assist device are passed to a one or more processing unit during frame.

With reference to the example NP environment 10 depicts FIG. 1, one NP Interface device 15a is provided on a primary blade (i.e., printed circuit board element) 20a with a second NP interface device 15b provided on a secondary blade 20b. It is understood that the system may be expanded to include many blades [primary and secondary (s)] and CP subsystems, for example, in a distributed network configuration. A Control Point subsystem ("CP") 50 includes a system processor 52 that is connected to the NP environment configuration. The system processor at the CP, among other things, provides initialization and configuration services to the NP device by issuing system control frames herein referred to as "Guided frames". The CP 50 may be located in any of three locations: in the interface device chip; on the blade on which the chip is mounted (as depicted in FIG. 1); or, external to the blade. If external to the blade, the CP may be remote; that is, it is housed elsewhere and communicates via a network connecting the interface device and the CP 50. The elements of a CP generally include a processor 52, memory elements (cache, flash and SDRAM), a memory controller, a PCI bus, and connectors for a backplane and for L1 network media. As will be described in greater detail herein, in the preferred embodiment, a guided frame is a variable word structure including the following information: 1) frame control information comprising data for indicating which blade the frame is meant for, and to which functional block within the frame it should be sent 2) correlator information for indicating in the frame where any response frame is to be sent if an error or exception occurs or if frame processing is successful; 3) guided commands including control operands that control or mange the functional units within the blades, e.g., fill a memory location with data; and, 4) an end delimiter command indicating the end of the frame. Each of these will be discussed in greater detail with reference to FIG. 12. dispatch. One processing unit, in particular, referred to as a General Data Handler (GDH) comprises a full CLP processing unit and five coprocessors and are primarily used for forwarding frames. At least two of the N protocol processors are specialized; one for handling Guided Frames—the Guided Frame Handler, GFH 18, and one for building Lookup Data in Control Memory—the Guided Table Handler, GTH 19.

Figure 2:
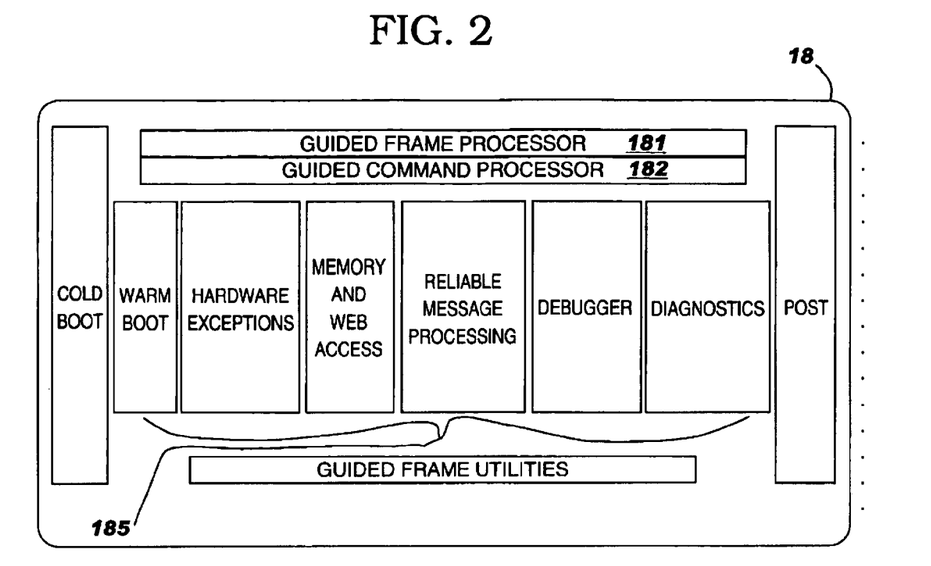
FIG. 2 illustrates a block diagram of a Guided Frame Handler component 18 of a network processor device depicted in FIG. 1.

In the preferred embodiment, all frames classified as guided frames are enqueued to an Ingress queue of the GFH on the blade receiving the frame. FIG. 2 depicts the general functional layout of the guided frame handler GFH unit 18. A detailed description of the GFH architecture may be found in above-mentioned commonly-owned, co-pending U.S. patent Ser. application No. 09/384,691. Generally, the GFH 18 is a hardware device that implements software components including a Guided Frame Processor 181 that is responsible for performing guided frame parsing and routing functions; and, a guided command processor 182 that is responsible for interpreting guided "commands" in the guided frame and ensuring that these commands are processed. Particularly, the Guided Frame Processor 181 receives and processes the guided frames and, particularly, is responsible for validating the guided request frame and determining whether the GFH is capable of processing the received frame. It also determines the type of acknowledgment (if any) that is required by the sender. The Guided Frame Processor 181 additionally runs through the request frame until it finds the first guided command to be processed and then passes control to the Guided Command Processor 182. On completion of a command, control is passed back to the Guided Frame Processor 181. Otherwise, the Guided Command Processor processes each guided command of the frame until either the Guided Command Processor returns an error or an End_Delimiter Command is encountered. At this point, frame processing is deemed complete.

The Guided Command Processor is responsible for processing a guided command embedded in the guided request frame. It is invoked by the Guided Frame Processor with a reference to the position in the request frame where the command is to be found. the Guided Command Processor parses the command identifier to determine whether it is capable of processing the command. If the specified command is unsupported, an error is returned to the Frame Parser. Else, in the manner described herein, control is transferred to the appropriate functional block of the blocks 185 shown in FIG. 2, which actually services the command.

Figure 3:
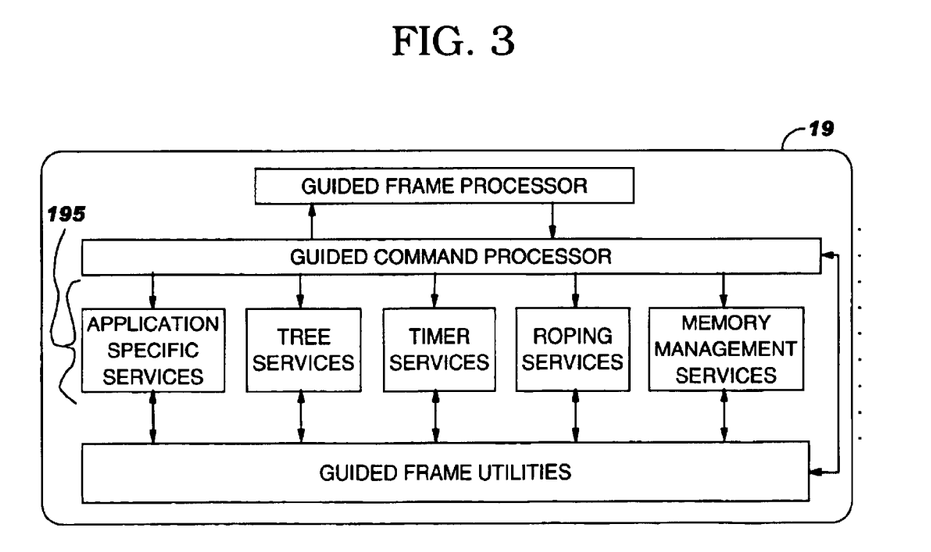
FIG. 3 illustrates a block diagram of a Guided Table Handler component 19 of a network processor device depicted in FIG. 1.

FIG. 3 depicts the functional layout of the GTH unit 19. A detailed description of the GTH architecture may be found in above-mentioned, commonly-owned, co-pending U.S. patent Ser. application No. 09/384,691 and particularly, is dispatched when the NP dispatcher sees that it is idle and that a guided request frame is available in the GTH queue. The GTH functions in a similar manner as the GFH in that incoming frames are validated by a guided frame processor 191 and control is passed to a guided command processor 192 for processing of commands. As shown in FIG. 3, the service blocks 195 included within the GTH perform different operations than the functional blocks contained in the GFH. It is understood, however, that the purpose of the guided frames are to actually manage and control each of the operational blocks shown in FIGS. 2 and 3.

What now follows are detailed descriptions of exemplary GFH message flow scenarios for controlling and managing the NP device behavior according to the present invention. In a first example, illustrated in FIGS. 4(a) and 4(b), there is depicted an example scenario 200 including message flows between a CP subsystem 50 and a Guided Frame Handler (GFH) 18 on a primary blade 20a.

Figure 4A:
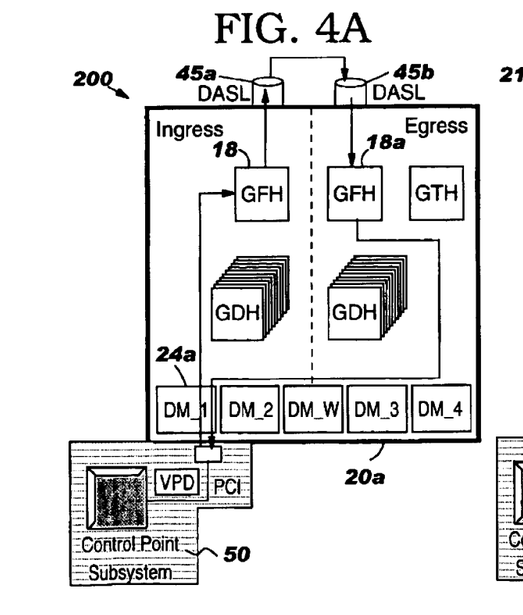
FIGS. 4(a) and 4(b) illustrate example messaging scenarios depicting guided frame flows between a CP and a GFH (FIG. 4(a)) on a single blade and, a GDH and a GFH (FIG. 4(b)) on a single blade according to the present invention.

In the example scenario 200 illustrated in FIG. 4(a), the Guided "Request" Frame includes embedded guided commands destined for the Ingress GFH of the primary blade. The GFH processes the guided request as follows: In a first step, the guided frame is generated by the CP 50 and is transmitted to the primary blade 20. In this scenario, it is assumed that the frame includes bits that indicate that a response is required. The frame is received by the Ingress-GFH on the primary blade 20a and parsed. The results of parsing indicate that the frame is destined for itself. Therefore, the embedded guided commands are processed by the Ingress-GFH, and particularly are carried out by the guided command processor. Assuming that the processing was successful, the results are stored in the frame and the frame control information is modified to indicate that frame is now a "Response" frame. It is then enqueued on an Ingress Queue (not shown) with a target blade address that corresponds to the primary blade, and is transmitted to an Egress-GFH of the primary blade 20a via the DASL interface 45a,b. Then, the Egress-GFH 18a parses the frame, notes that the frame is a response frame and enqueues it in an appropriate Egress Queue (not shown). This enables the frame to be transmitted through a DM interface, e.g., DM 24a, through an interface connected to the CP 50 which eventually receives the response frame.

In the alternate scenario 200 than that depicted in FIG. 4(a), the Guided "Request" Frame includes embedded guided commands destined for the Egress GFH of the primary blade. In this scenario, a guided frame is generated by the CP 50 and transmitted to the primary blade and it is assumed that the frame includes bits that indicate that a response is required. The frame is received by the Ingress-GFH on the primary blade and is parsed. In this case, the results of parsing indicate that the frame is destined for the Egress-GFH. Therefore, the frame is enqueued in the Ingress Queue with the target blade set to the Primary Blade and, is transmitted to an Egress-GFH of the primary blade 20a via the DASL interface 45a,b. The Egress-GFH then parses the frame and determines that it is destined for itself. Therefore, it processes the frame and builds a response frame. After response frame build, it is enqueued in the appropriate Egress queue which then causes the response frame to be sent out through the DM interface to the interface connected to the CP.

Figure 4B:
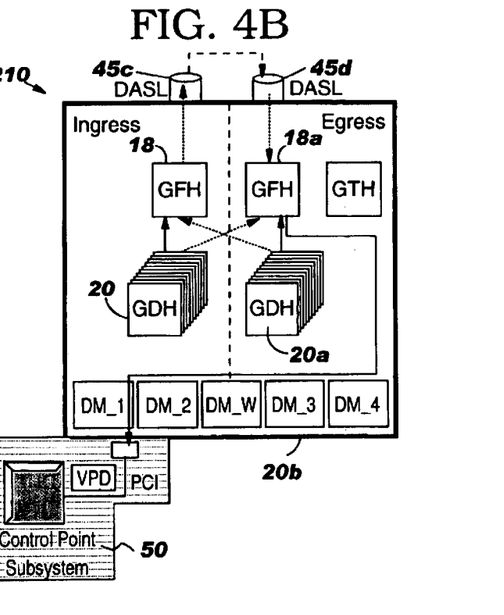

In the example scenario 210 illustrated in FIG. 4(b), the Guided "Request" Frame is generated internally by a General Data Handler (GDH) and includes embedded guided commands that are destined for the Ingress GFH 18 on the primary blade. The GFH processes the guided request as follows: In a first step, an Ingress-GDH on the primary blade builds a guided frame destined for the Ingress-GFH on the same blade and the frame is enqueued to the Ingress-GFH Queue. The frame is received by the Ingress-GFH and, during frame processing it is determined that it is destined for itself. Therefore, the Ingress-GFH processes the frame. Assuming that no errors were encountered during processing, the frame is enqueued to the Ingress Discard Queue after processing as there was no bit indication that a response frame was required. If an error was encountered, and a bit in the frame header indicates that a Negative Acknowledgment is required, a Negative Acknowledgment frame is built and enqueued to the Ingress Queue for dispatch to the Egress-GFH 18a. Once, the response frame is received by the Egress-GFH, it examines the frame header, learns that it is a response frame and so enqueues it to the appropriate Egress Queue for dispatch to the CP 50 where the Negative Acknowledgment frame response frame is received.

In a first alternate scenario than scenario 210 depicted in FIG. 4(b), the Guided "Request" Frame is generated internally by a General Data Handler (GDH) and includes embedded guided commands that are destined for the Egress GFH 18a on the primary blade. In this scenario, an Ingress-GDH 20 on the primary blade builds a guided frame destined for the Egress-GFH. Preferably, there are two places where this frame may be built: 1) on the Ingress Data Store; or 2) on the Egress Data Store. If the frame is built on the Ingress Data Store, the Ingress-GDH enqueues the frame to the Ingress GFH Queue. The Ingress-GFH receives and parses the frame. As the frame indicates that it is destined for the Egress-GFH, the Ingress-GFH enqueues the frame to the Ingress Queue with the target blade set to the Primary Blade and, is transmitted to an Egress-GFH of the primary blade 18a via the DASL interface 45c,d. Alternatively, the GDH may directly enqueue the frame to the Ingress Queue with the target blade set to the Primary Blade. If however, the frame is built on the Egress Data Store, the Ingress-GDH enqueues the frame to the Egress GFH Queue so that the frame may be received and processed by the Egress-GFH. Assuming that no errors were encountered, the frame is enqueued to the Egress Discard Queue after processing. If an error was encountered and the frame header included a bit indicating that a Negative Acknowledgment is required, a Negative Acknowledgment frame is built and enqueued to the appropriate Egress interface Queue for eventual receipt by the CP 50 via a DM interface.

In a second alternate scenario than scenario 210 depicted in FIG. 4(b), the Guided "Request" Frame is generated internally by an Egress-GDH 20a on the primary blade and includes embedded guided commands that are destined for the Egress GFH 18a on the primary blade. In this scenario, an Egress-GDH 20a on the primary blade builds a guided request frame using the Egress Data Store, destined for the Egress-GFH on the primary blade. The Egress-GDH thus enqueues the frame to the Egress GFH Queue where it is received and processed by the Egress-GFH. Assuming that the processing was successful, the frame is enqueued to the Egress Discard Queue. However, if an error was encountered and the frame indicated that a Negative Acknowledgment was required, a Negative Acknowledgment frame is built and enqueued to the appropriate Egress interface Queue for eventual receipt by the CP 50 via a DM interface.

In a third alternate scenario than scenario 210 depicted in FIG. 4(b), the Guided "Request" Frame is generated internally by an Egress-GDH 20a on the primary blade and includes embedded guided commands that are destined for the Ingress GFH 18a on the primary blade. In this scenario, an Egress-GDH on the primary blade builds a guided frame destined for the Ingress-GFH at either of the Egress Data Store or the Ingress Data Store locations. If the frame is built on the Egress Data Store, the Egress-GDH enqueues the frame to the Wrap DM Queue 25 which enables the frame to reach the Ingress-GFH. Otherwise, if the frame is built on the Ingress Data Store, the Egress-GDH enqueues the frame to the Ingress GFH Queue for the latter to reach the Ingress-GFH where the frame is received and processed by the Ingress-GFH. Assuming no errors were encountered, the frame is enqueued to the Ingress Discard Queue after processing. If an error was encountered and the frame indicated that a Negative Acknowledgment was required, a Negative Acknowledgment frame is built and enqueued to the Ingress Queue with the target blade set to the Primary Blade for receipt by the Egress-GFH where the frame is parsed. As the frame indicates that it is a response frame, the Egress-GFH enqueues the frame to the appropriate Egress Target Port Queue for eventual receipt by the CP 50 via a DM interface.

Figure 5A:
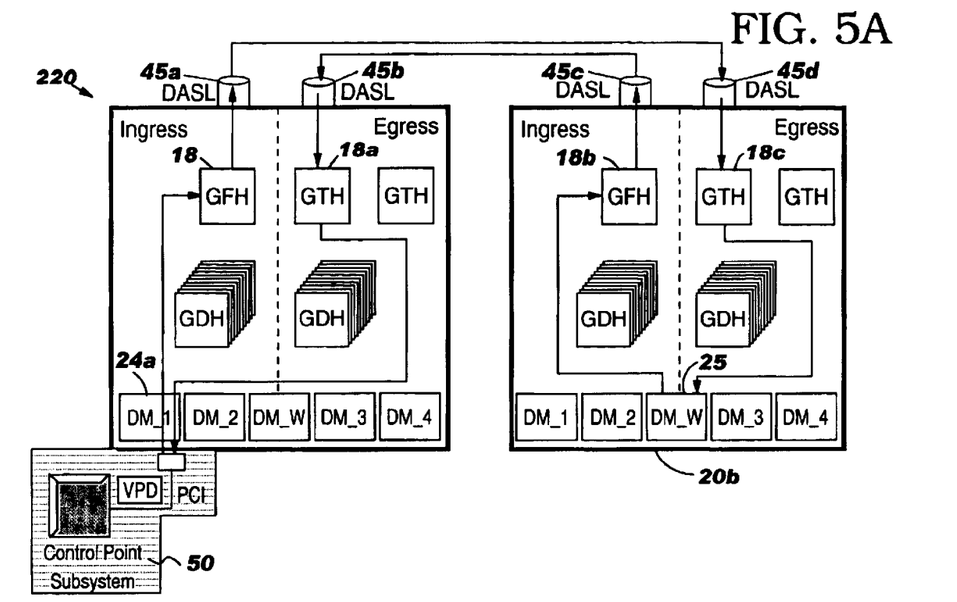
FIGS. 5(a) and 5(b) illustrate example messaging scenarios depicting guided frame flows between a CP and a GFH (FIG. 5(a)) on a secondary blade and, a GDH and a GFH (FIG. 5(b)) on a secondary blade according to the present invention.
Figure 5B:
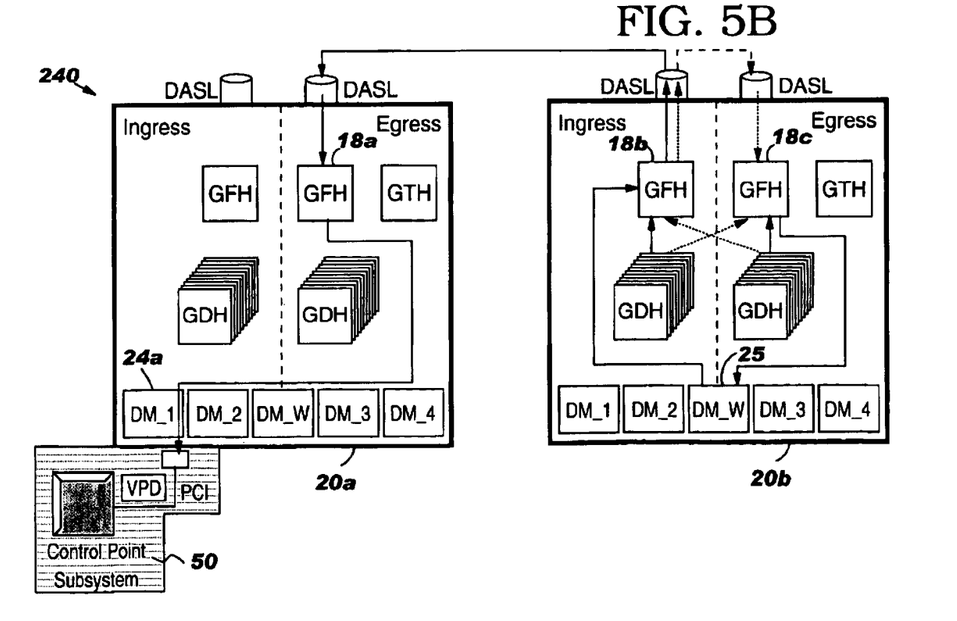

In a second example, illustrated in FIGS. 5(*a*) and 5(*b*), there is depicted an example scenario 220 including message flows between a CP subsystem 50 and a Guided Frame Handler (GFH) 18 on a secondary blade.

In the example scenario 220 illustrated in FIG. 5(*a*), the Guided "Request" Frame includes embedded guided commands destined for an Egress GFH on a secondary blade 20*b*. The GFH processes the guided request as follows: In a first step, the guided frame is generated by the CP and transmitted to the primary blade. In this example scenario, it is assumed that the frame control information includes bits that indicate that the frame is targeted for the Egress-GFH residing on a secondary blade and that a response is required. The frame is received by the Ingress-GFH 18 on the primary blade 20*a* and is parsed. As a result of parsing, it is determined that the frame is destined for the Egress GFH 18*c* on a secondary blade 20*b*. The frame is thus enqueued to the Ingress Queue with the target blade address set appropriately so that it may be dispatched to the Egress-GFH residing on the targeted blade. Upon receiving the frame, the Egress-GFH 18*c* parses the frame, and determines that the frame is destined for itself. The Egress-GFH processes the request frame and builds a response frame. The Egress-GFH then sends the response to the Ingress-GFH 18*b* component on the same blade by enqueuing the response to the Wrap Queue DM 25. The Ingress-GFH frame 18*b* implements a parsing operation and determines that the frame is a response frame. The frame is thus routed to the CP 50 by enqueuing the frame on the Ingress Queue after setting the target blade address to that of the primary blade 18*a*. The frame is thus received via the DASL interface 45*c* by the Egress-GFH 18*a* on the primary blade where it is parsed. As the frame control information indicates that it is a response frame, the Egress-GFH 18*a* enqueues the frame to the appropriate Egress interface Queue. This enables the frame to be transmitted through a DM interface, e.g., DM 24*a*, through a port connected to the CP 50 which eventually receives the response frame.

In an alternate scenario related to example scenario 220 depicted in FIG. 5(*a*), the Guided "Request" Frame includes embedded guided commands destined for the Ingress-GFH 18*b*. In this scenario, the guided frame is generated by the CP 50 and first transmitted to the primary blade. It is assumed that the frame control information includes bits that indicate that the frame is targeted for the Ingress-GFH 18*b* residing on a secondary blade and that a response is required. Thus, the frame is received by the Ingress-GFH 18 on the primary blade and parsed, resulting in the determination that the frame is destined for the Ingress GFH on a secondary blade. In response, the frame is enqueued to the Ingress Queue with the target blade address set appropriately so that it may be dispatched to the Egress-GFH residing on the targeted blade. The Egress-GFH parses the frame, determines that the frame is destined for the Ingress component of itself and, in response, enqueues the frame to the Wrap Queue DM 25 so that it may be received by the Ingress-GFH 18*b*. The Ingress-GFH 18*b* then processes the request frame and builds a response frame. The response frame is routed back to the CP 50 by enqueuing the frame on the Ingress Queue after setting the target blade address to that of the primary blade where it is received via the DASL interface 45*b* by the Egress-GFH 18*a* on the primary blade. The frame is parsed at the Egress-GFH 18*a* on the primary blade and it is determined that the frame is a response frame. In response, the Egress-GFH enqueues the frame to the appropriate Egress interface Queue. This enables the frame to be transmitted through a DM interface, e.g., DM 24*a*, through a port connected to the CP 50 which eventually receives the response frame.

In the example scenario 240 illustrated in FIG. 5(*b*), the Guided "Request" Frame is generated by the GDH on a secondary blade 20*b* and includes embedded guided commands destined for an Ingress 18*b* or Egress GFH 18*c* on the secondary blade 20*b*. In this example scenario 240, the flow is identical to that described for the like primary blade example scenario as described herein with respect to FIG. 4(*b*). The only difference is in the path followed by the Negative Acknowledgment message generated by the GFH in case of an error. That is, in the case of the Ingress-GFH processing the request frame, the Negative Acknowledgment frame is enqueued to the Ingress Queue, specifying the primary blade 20*a* as the target blade. In the case of the Egress-GFH, this message is wrapped to -the Ingress-GFH on the secondary blade via the DM_W interface 25. The Ingress-GFH routes the frame to the Egress-GFH of the primary blade by enqueuing it to the Ingress Queue with the target blade set to the Primary Blade. When the Egress-GFH of the primary blade receives the frame, it parses the frame and determines that the frame is a response frame. In response, the Egress-GFH enqueues the frame to the appropriate Egress Target Interface Queue. This enables the frame to be transmitted through a DM Interface, e.g., DM 24*a*, through a port connected to the CP 50 which eventually receives the response frame.

As will now be described with respect to FIGS. 6(*a*) and 6(*b*), there is an example scenario 260 including multi-blade message flows, e.g., between a CP subsystem 50 and a Guided Table Handler (GTH) 18 on both primary and secondary blades. The message flows associated with this example scenario is a combination of the messages flows described for primary and secondary blades. When a frame is received from the CP by the Ingress-GFH on the primary blade 18, it is parsed. The results of parsing indicate that the frame is destined for GTHs on multiple blades. The frame is therefore forwarded to all the targeted blades by enqueuing the frame to the Ingress Queue with the list of target blades. The processing of the frame when it is received by the Egress-GFH on each target blade remains the same as described previously. It should be noted that multiple response frames will be sent to the CP corresponding to the number of blades that were originally targeted. For the related example scenarios where the guided frames are generated by a GDH and destined for GTHs on primary and secondary blades, this is similar to the case described above with the condition that no responses are ever sent back to the originating GDH. If Negative Acknowledgment was specified then, under error conditions, one or more Negative Acknowledgment frames will be sent to the CP.

Figure 6A:
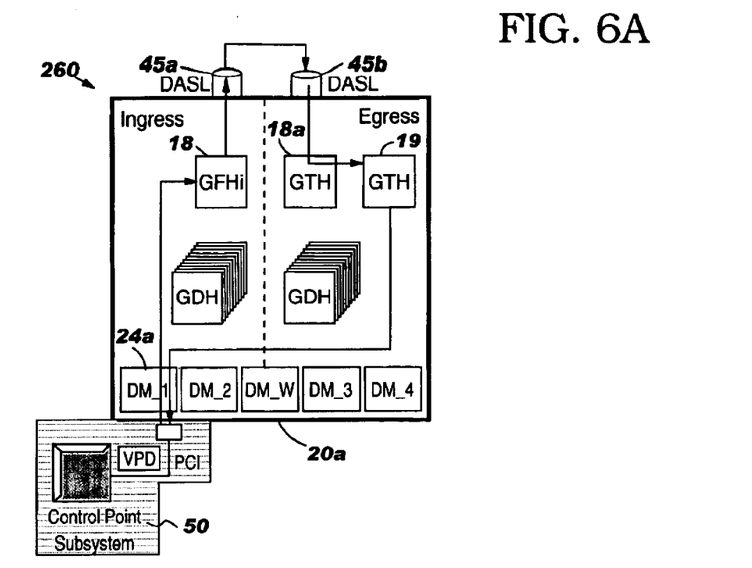
FIGS. 6(a) and 6(b) illustrate example messaging scenarios depicting guided frame flows between a CP and a GTH (FIG. 6(a)) on a single blade and, a CP and a GTH (FIG. 6(b)) on a secondary blade according to the present invention.
Figure 6B:
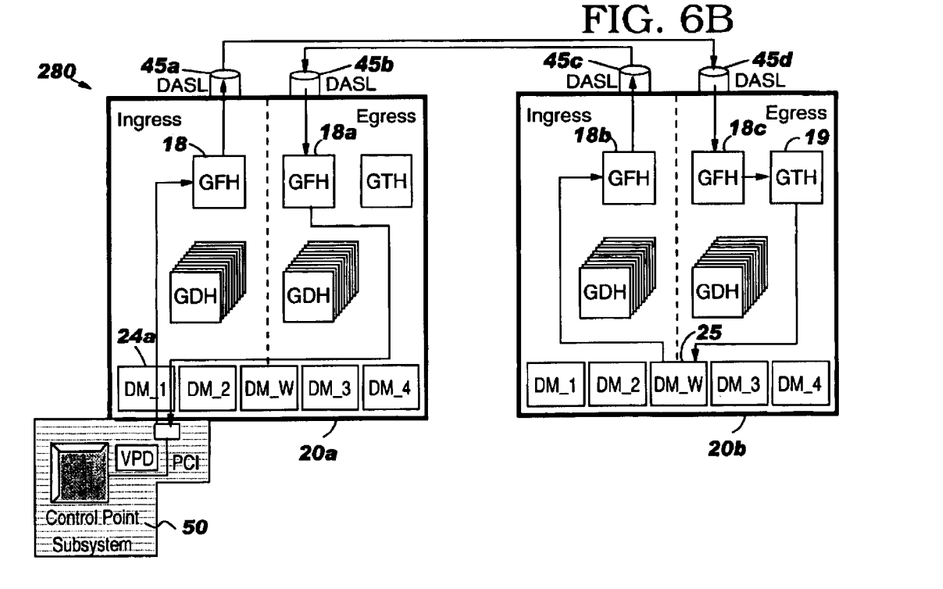

Thus, in the third example scenario 260 illustrated in FIG. 6(*a*), the Guided "Request" Frame is generated by the CP 50 and includes embedded guided commands destined for a GTH 19 on the primary blade 20*a*. For this example scenario, it is assumed that the frame control information includes bits that indicate that the frame is targeted for the GTH residing on the egress of the primary blade and, that a response is required. In operation, the frame is received by the Ingress-GFH 18a on the primary blade and is parsed. The results of parsing indicate that the frame is destined for the GTH 19 on the primary blade 20a. The frame is thus enqueued on the Ingress Queue with a target blade address that corresponds to the primary blade. This causes the frame to reach the Egress-GFH 18a of the primary blade via the DASL interface 45a,b. The Egress-GFH 18a parses the frame, notes that the frame is destined for the GTH and enqueues the frame on the Egress-GTH Queue for dispatch to the GTH on the primary blade.

The GTH parses the received frame. The results of parsing indicate that a response is required and that the source of the request was the CP. As will be described in greater detail herein with respect to FIG. 12, the "Correlator" field of the frame indicates that the source of the frame was the CP 50. The GTH processes the request frame and builds a response frame. The GTH 19 then sends the response frame back to the CP 50 by enqueuing the frame on the appropriate Egress interface Queue. This enables the frame to be transmitted through a DM interface, e.g., DM 24a, through a port connected to the CP 50 which eventually receives the response frame. In an alternate scenario 280 depicted in FIG. 6(b), the Guided "Request" Frame is generated by the CP 50 and includes embedded guided commands destined for the GTH 19 on a secondary blade 20b. Thus, in this scenario it is assumed that the frame contains bits that indicate that the frame is targeted for the GTH residing on a secondary blade and that a response is required. In accordance with the previous described flows, the guided frame is first received by the ingress GFH on the primary blade and parsed. As a result of parsing, it is determined that the frame is destined for the GTH on a secondary blade 20b. The frame is thus enqueued to the Ingress Queue with the target blade address set appropriately for dispatch to the Egress-GFH 18c residing on the targeted blade 20b. The Egress-GFH parses the frame, notes that the frame is destined for the GTH and so enqueues the frame to the Egress GTH Queue. This causes the frame to be received by the GTH which parses the received frame. The results of parsing will determine that a response is required and, it is determined from the "Correlator" field of the frame control information (FIG. 12) that the source of the frame was the CP 50. The GTH then processes the request frame, builds a response frame, and sends the response the Ingress-GFH 18b on the secondary blade via the DM_W interface 25. The Ingress-GFH then performs a parsing operation and determines that this is a response frame. Therefore, the frame is routed to the CP 50 by enqueuing the frame on the Ingress queue after setting the target blade address to that of the primary blade 20a. The frame is received via the DASL interface 45b by the Egress-GFH on the primary blade 20a and is parsed. As the frame indicates that it is a response frame, the Egress-GFH enqueues the frame to the appropriate Egress interface Queue. This enables the frame to be transmitted through a DM interface, e.g., DM 24a, through a port connected to the CP 50 which eventually receives the response frame.

As will now be described with respect to FIGS. 7(a) and 7(b), there is an example scenario 280 including message flows between a GDH 17a and a GTH 19 on both primary and secondary blades.

Figure 7A:
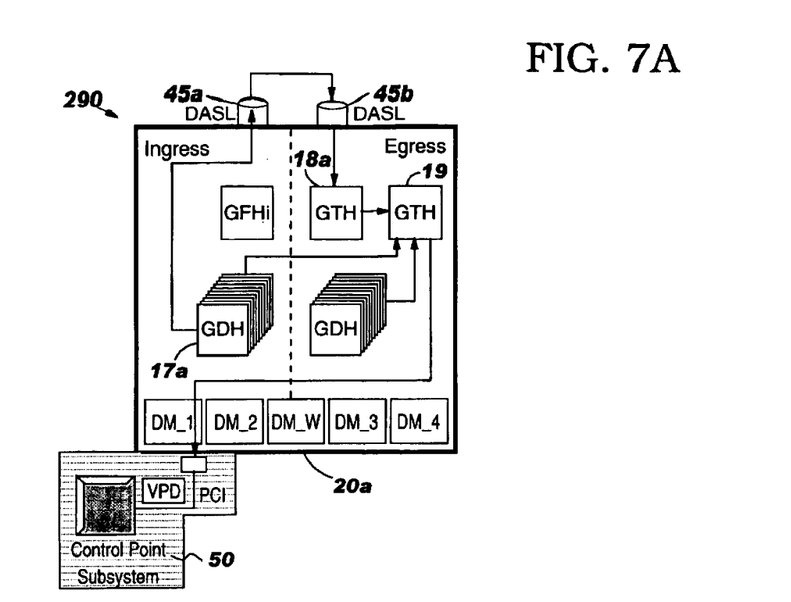
FIGS. 7(a) and 7(b) illustrate example messaging scenarios depicting guided frame flows between a CLP and a GTH (FIG. 7(a)) on a single blade and, a CLP and a GTH (FIG. 7(b)) on a secondary blade according to the present invention.

Thus, in the fourth example scenario 290 illustrated in FIG. 7(a), the Guided "Request" Frame is generated by the Egress-GDH 17a and includes embedded guided commands destined for a GTH 19 on the same (primary) blade. The frame is first routed to the Egress-GFH on the primary blade 20a by enqueuing the frame on the Ingress Queue for dispatch to and receipt by the Egress-GFH 18a via the DASL interface 45a,b. The Egress-GFH 18a parses the frame, notices that it is destined for the GTH 19, and therefore enqueues the frame on the Egress GTH Queue. This causes the GTH to receive the frame. The GTH then parses the frame and from the Correlator field of the frame control information, determines that the originator of the frame is a GDH. The GTH then processes the frame, and after processing, the frame is discarded by enqueuing it to the Egress Discard Queue. Consequently, no response is sent to the GDH.

Figure 7B:
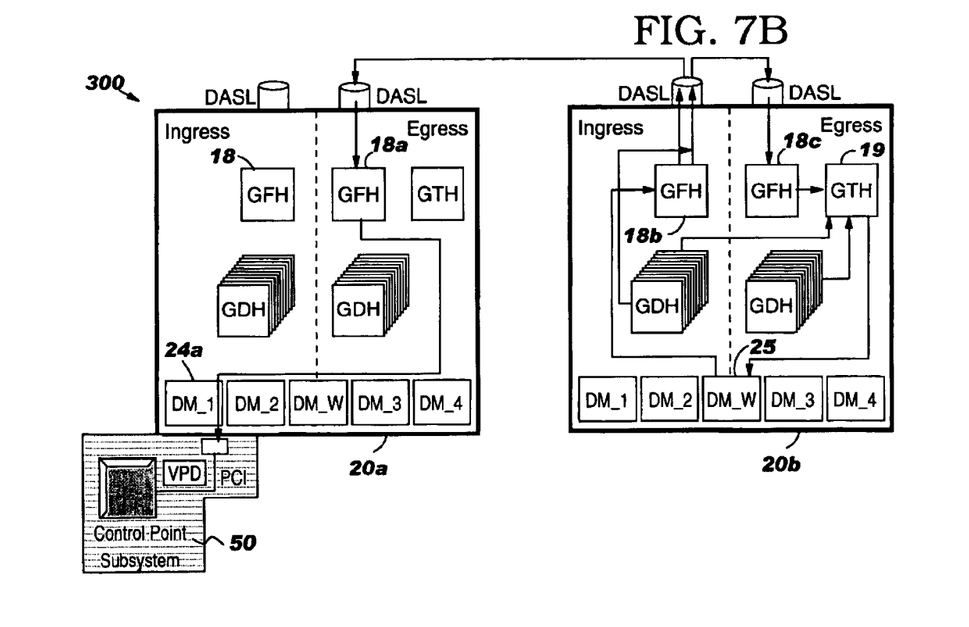

In an alternate scenario 300 depicted in FIG. 7(b), the Guided "Request" Frame is generated by the GDH 17b and includes embedded guided commands destined for the GTH 19 on a secondary blade 20b. In this scenario, the flow is identical to that described for the primary blade with the only difference being the path followed by the Negative Acknowledgment message generated by the GTH 19 in case of an error. This message is wrapped to the Ingress-GFH 18b on the secondary blade via the DM_W interface 25. The Ingress-GFH routes the frame to the Egress-GFH 18a of the primary blade 20a by enqueuing it to the Ingress Queue where it is eventually forwarded to the CP 50.

Figure 12:
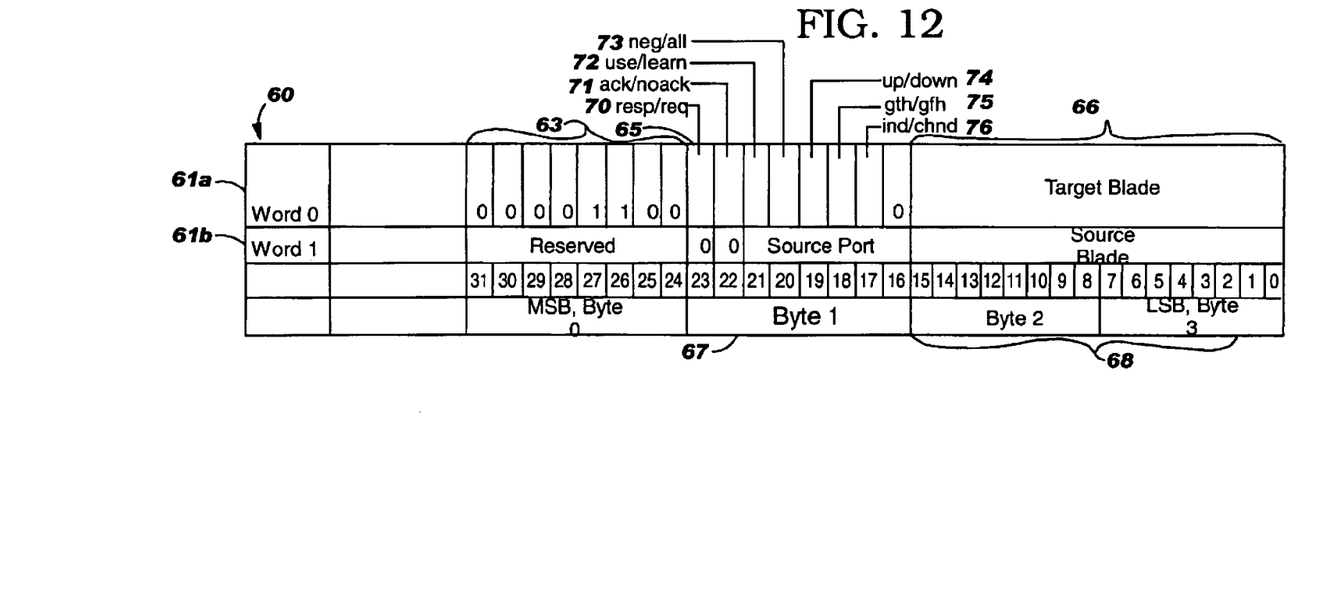
FIG. 12 is a detailed illustration depicting the frame control information included in a guided frame.

FIG. 12 depicts the format of the frame control information 60 of a guided frame. As shown in FIG. 12, this frame control information 60 includes a two word structure each word 61a, 61b of four (4) bytes each. In the first word 61a there is included a first byte of data 63 which is a number, e.g., OCH, that identifies the frame as a control frame. The second byte 65 includes bit flags for providing various processing/routing indications including: a first resp/req flag 70 which is set to indicate whether the frame is a request frame or a response frame; a second ack/noack flag 71 which is set to indicate whether to always reply to the source, e.g., CP, or never reply; a third use/learn flag 72 which is set to indicate whether the blade is to learn where the frame came from (the source address and port of the frame), or whether the source address information is explicitly provided in the frame; a fourth neg/all flage 73 which operates in conjunction with the ack/noack flag 71 for indicating whether a response is to be provided only if an error occurs while processing the frame (neg is set), or if the source always wants a response back regardless if a processing error occurs; a fifth ingress/egress flag 74 which is set to indicate which side of the blade the frame is destined for, i.e., the ingress or egress side; a sixth GTH/GFH flag 75 which indicates what picoprocessor within the blade is to process the flag; and, a seventh ind/chnd flag 76 which is an independent/chained command processing indicator set to indicate that the target preprocessor is to continue processing of guided frame commands even if an error occurs, or, is to stop processing if an error occurs. The next field 66 is a 16 bit field that includes the address of the target blade to which the frame is to be sent. It is understood that this may include unicast or multicast addresses as well. That is, as part of frame processing, the Guided Frame Processor will compare the blade address of the target blade field 66 with the one programmed into the blade as a part of initialization. If these addresses match, then it is assumed that the frame is for that blade only. If these addresses do not match, it is assumed to be targeted for another blade or blades in the system (i.e., is a unicast or multicast address) and, as a result, will be passed up to a switch fabric (not shown) which has the intelligence to determine the blade(s) to which the frame should be targeted.

In the second word 61b of the frame control information 60, there is included at least a first byte of data 67 for indicating the source port from which the guided frame originated. In the scenarios described, this source port may include a data mover (DM) interface port, for example. Two additional bytes of data 68 include a source blade address for the origination frame. It is understood that how these frames are built depends on the use/learn flag 72. For example, the blade will not fill the source port and source blade address fields if the "learn" flag 72 is not set. Thus, the blade processing is responsible for learning where the frame came from. Generally, guided frames that are generated internally (e.g., by a GDH) will not require response frames, i.e., the ack/noack field 71 is set to noack. Thus, these fields will not be set. However, if exceptions/error are to be reported to CP as unsolicited response frames, for example, the NP will be configured to know the source blade and port of the CP.

With further regard to the composition of the guided frame, the correlator information that is provided may range anywhere from two to five bytes (not shown) and provides a unique identifier so that when a response frame is returned to the CP for example, it may be correlated with the original command of the guided request frame. This is necessary because in the course of processing a single guide frame with many embedded commands, multiple response frames may be returned to the requesting CP and each response needs to be correlated.

With regard to the remaining composition of the guided frame, there is provided one or more command fields containing the directives or operations that are used to configure and control the NP devices in an NP networking environment. Preferably, each command field includes at least three (3) sub-fields including: 1) a command control word for identifying the type of command that is to be performed; 2) an address field indicating the address locations within the NP device on which the command(s) is to operate; and, 3) a field of operands of variable length which comprise the data associated with the command type. For example, a command type may include, setup register, or, fill memory location with data and the address information sub-field will provide the address of the register/memory location at which the operand data is to be filled. It is understood that there are many command types which may be implemented for controlling and configuring the functional blocks indicated in the GFH and GTH structures of FIGS. 2 and 3, respectively. A unique end of frame delimiter is the remaining word in the guided frame to indicate that no more commands are provided and that guided frame processing is to cease.

The previously described guided frame message flow scenarios depicted in the figures are embodied by the flow charts in FIGS. 8–11 as will now be described.

Figure 8:
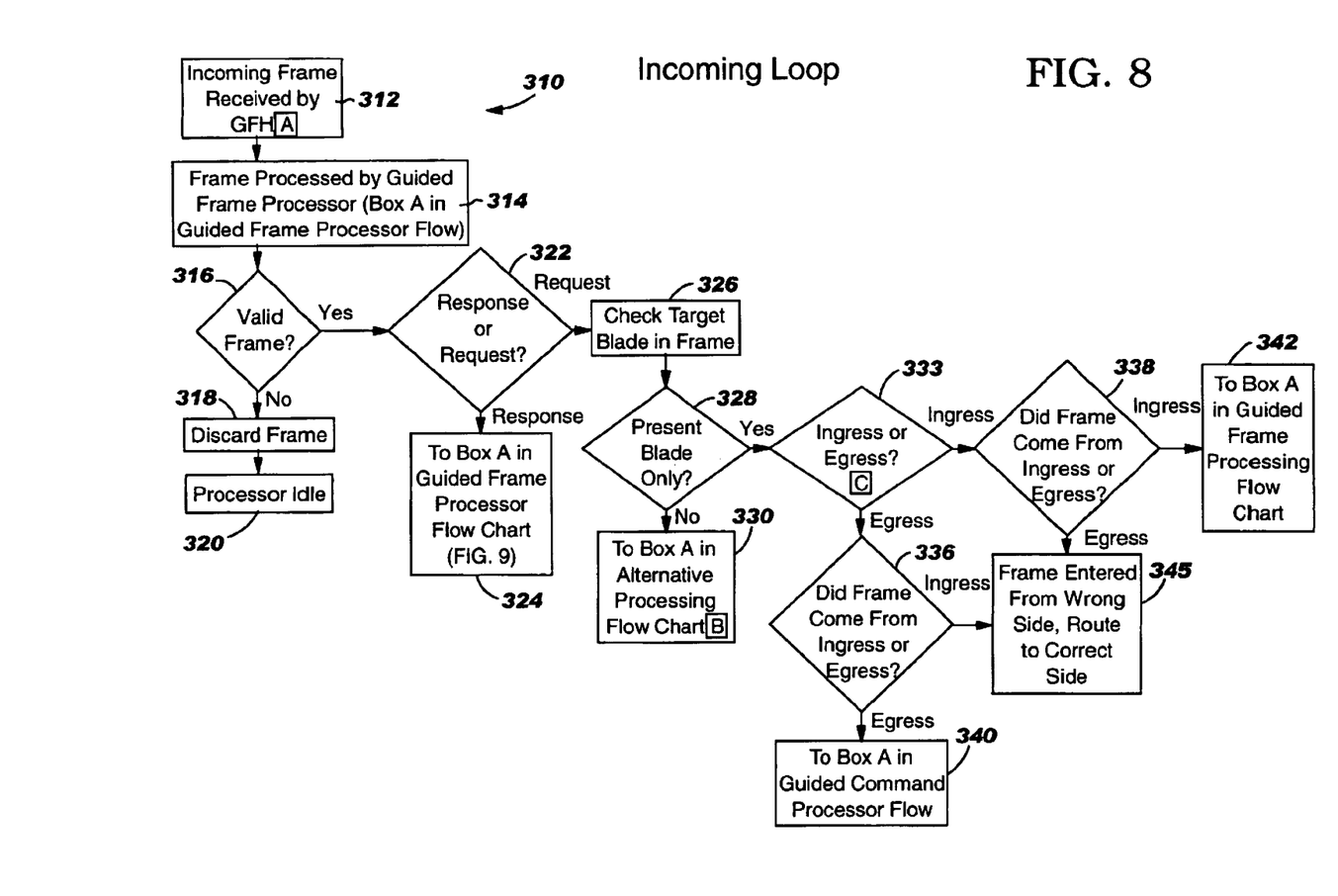
FIG. 8 is a flow diagram 310 depicting the processing of a guided frame in the GFH.
Figure 9:
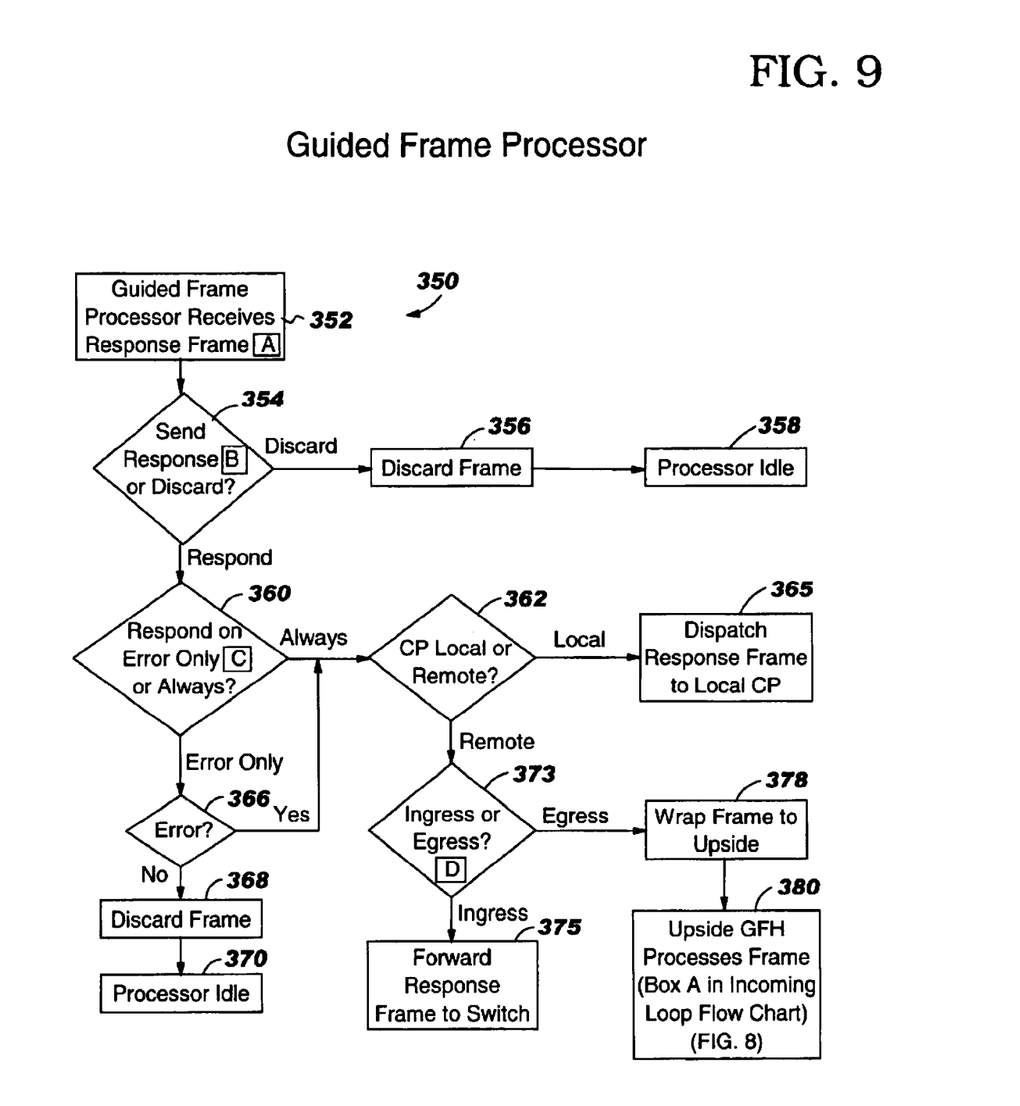
FIG. 9 is a flow diagram 350 depicting the guided frame processing of a guided frame.
Figure 10:
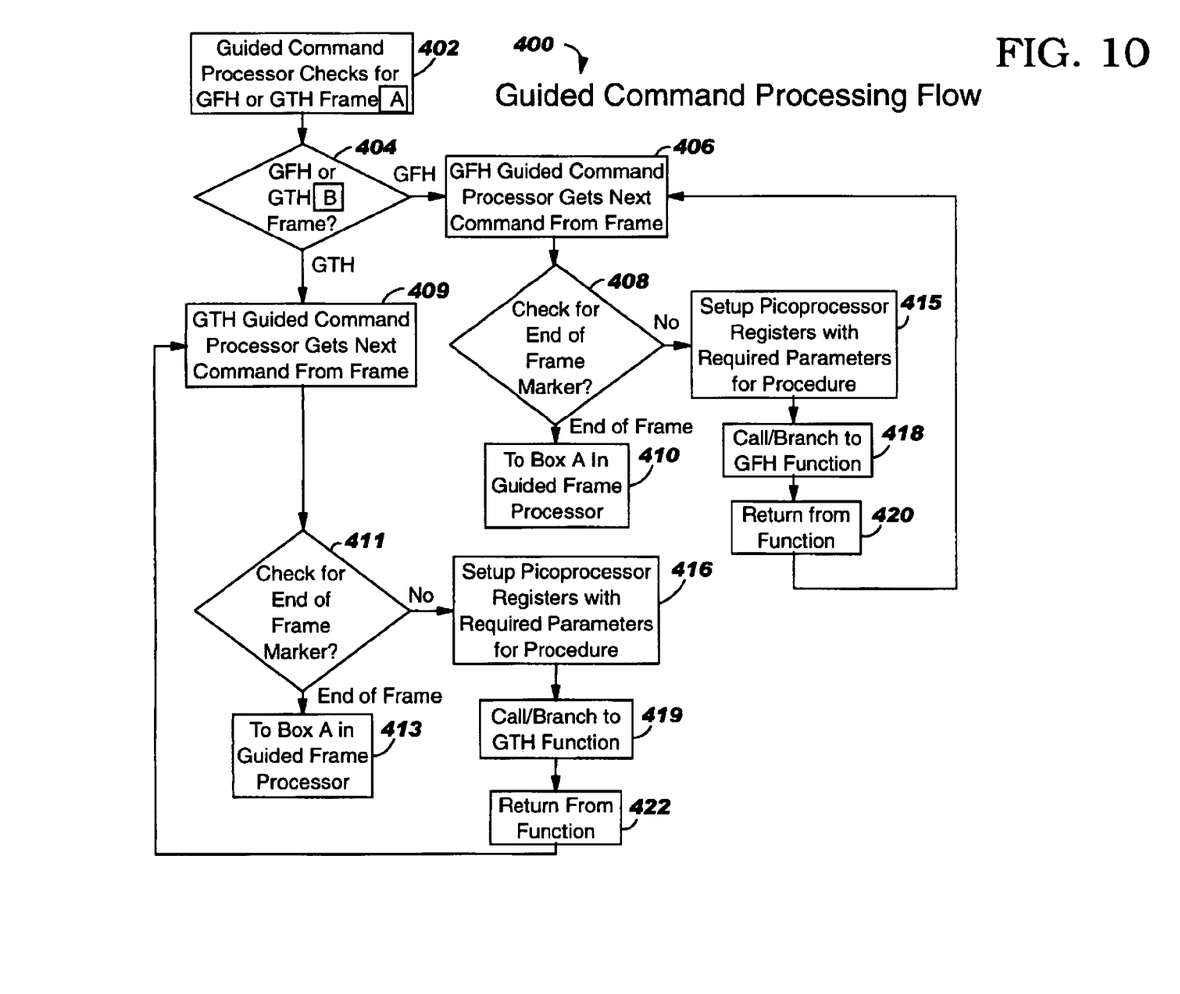
FIG. 10 is a flow diagram 400 depicting the guided command processing of commands within guided frame.
Figure 11:
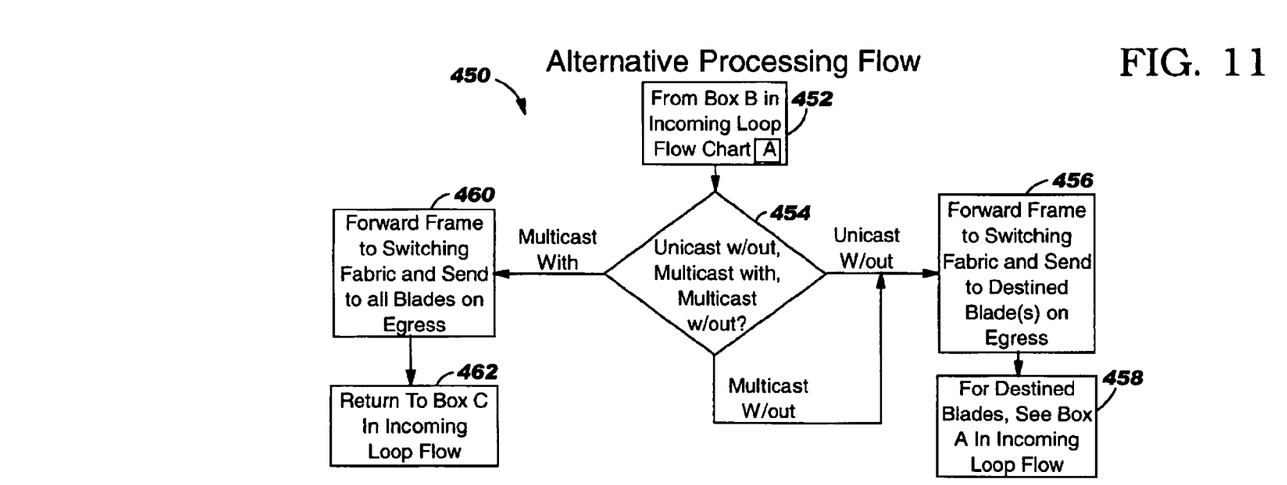
FIG. 11 is a flow diagram 450 depicting processing of guided frames that are not unicast and are not destined for present blade.

FIG. 8 is a flow diagram 310 depicting the processing of a guided frame in the GFH. As shown in FIG. 8, at step 312, the incoming guided frame is received by the GFH. At step 314, the frame is processed by the Guided Frame Processor of the GFH as depicted in FIG. 9, where the frame control information is parsed to determine whether it is a valid frame, i.e., includes the guided frame identifier. At step 316, a decision is made as to whether it is a valid frame and if it is not a valid frame, i.e., not a guided control frame, the frame will be discarded at step 318 and the processor will return to an idle state at step 320. If at step 316 it is determined that the frame is a valid guided frame, a decision is made at step 322 to determine whether the received frame is a response frame or a request frame. If it is determined that the frame is a response frame, the frame is processed by the Guided Frame Processor of the GFH at step 324 and proceeds in accordance with the Guided Frame Processor flow depicted in FIG. 9. Otherwise, if the received guided frame is a request frame, then the target blade address is determined at step 326. Then, at step 328, a decision is made as to whether the target blade is the current blade that received the frame. If the target blade in the frame is not destined for the present blade, then the frame is processed at step 330 in accordance with the Alternative Processing flow as depicted in FIG. 11. Otherwise, if the received guided frame is destined for the present blade, then a determination is made at step 333 as to whether the up(ingress)/down (egress) flag bit 74 (FIG. 12) is set in the first frame control word to indicate that the frame is destined for processing on the egress or ingress side of the blade. If the frame is destined for processing on the egress side, then a further determination is made at step 336 as to whether the frame came from the egress or ingress side of the blade. Likewise, at step 338, if the frame is destined for processing on the ingress side, then a further determination is made to whether the frame came from the egress or ingress side of the blade. If, at step 336, the frame is destined for the egress side and originated at the egress side, then the frame is processed at step 340 in accordance with the Guided Command Processor flow as depicted in FIG. 10. Likewise, at step 338, if the frame is destined for the ingress side and originated at the ingress side, then the frame is processed at step 342 in accordance with the Guided Command Processor flow as depicted in FIG. 10. If the frame is destined to a side opposite from the side from which it was received, then the frame is routed to the correct side, as indicated at step 345.

FIG. 9 is a flow diagram 350 depicting the guided frame processing of a guided frame. As shown in FIG. 9, at step 352, an incoming guided "response" frame is received from the GFH. At step 354, a determination is then made as to whether the ack/noack flag bit 71 (FIG. 12) is set in the first frame control word to indicate whether the response is to be sent or discarded. If no acknowledgment is required, then the frame will be discarded at step 356 and the processor will return to an idle state at step 358. If at step 354, it is determined that the response frame is to be sent, then a determination is made at step 360 as to whether the neg/all flag bit 73 (FIG. 12) is set in the first frame control word to indicate whether a response is to be always sent or whether a response is to be sent only when an error occurs. If the response is always to be sent, then a determination is made at step 362 as to whether the CP is attached locally or is remote. If the CP is local, then the response frame is dispatched to the local CP at step 365. If at step 360, it is determined that a response is to be sent only when an error occurs, then a determination is made at step 366 as to whether an error actually occurred during the processing. If so then the process proceeds to step 362 for dispatch to the CP whether remote or local. If it is determined that an error did not occur at step 366, then the frame will be discarded at step 368 and the processor will return to an idle state at step 370. Returning to step 362, if the CP to which a response frame is to be set is remote, then a decision is made at step 373 to determine whether the up(ingress)/down (egress) flag bit 74 (FIG. 12) is set in the first frame control word indicating where the frame was processed. If it is determined that the frame is at the ingress side, then at step 375, the response frame is forwarded to the DM interface for dispatch to the CP. Otherwise, if it is determined that the frame is at the egress side, then the response frame is wrapped around to the ingress side via the DM_W (wrap) interface at step 378, and the ingress-GFH processes the frame at step 380 in accordance with the incoming loop flow depicted in FIG. 9.

FIG. 10 is a flow diagram 400 depicting the guided command processing of commands within guided frame. As shown in FIG. 10, at step 402, a first determination is made as to whether the GFH/GTH flag bit 75 (FIG. 12) is set in the first frame control word indicating where the guided commands are to be processed. At step 404, if the bit flag 75 indicates GFH processing, then at step 406 GFH processing proceeds by retrieving the next command from the guided frame. A determination is then made at step 408 as to whether an end of frame delimiter is encountered, indicating end of guided frame processing. If the end of frame delimiter is encountered, then at step 410 control is returned to the guided frame processor for processing in accordance with the guided frame processor flow depicted in FIG. 8. If, at step 408, an end of frame delimiter was not encountered, then at step 415, the picoprocessor registers to be configured are loaded with the required parameters in accordance with the current guided command operands. The call is made to the GFH function (e.g., via a procedure call application program interface) at step 418 to perform the configuration setup, and, at step 420, the function returns control to the GFH guided command processor at step 406 for processing of the next command from the frame. Returning to step 404, if it is determined that the bit flag 75 indicates GTH processing, then at step 409 GTH processing proceeds by retrieving the next command from the guided frame. A determination is then made at step 411 as to whether an end of frame delimiter is encountered, indicating end of guided frame processing. If the end of frame delimiter is encountered, then at step 413 control is returned to the guided frame processor for processing in accordance with the guided frame processor flow depicted in FIG. 8. If, at step 411, an end of frame delimiter was not encountered, then at step 416 the picoprocessor registers to be configured are input with the required parameters in accordance with the current guided command operands. The call is made to the GTH function at step 419 to perform the configuration setup, and, at step 422, the function returns control to the GTH guided command processor at step 409 for processing of the next command from the frame.

As mentioned with respect to step 330, FIG. 8, if a request frame received at a primary blade is destined for a secondary or multiple other blades, process proceeds to the Alternative Processing Flow 450 as depicted in FIG. 11 at step 452. Specifically, FIG. 11 depicts processing 450 of guided frames that are not unicast and are not destined for present blade. Thus, the processing depicted in FIG. 11 is directed to for frames categorized as follows: 1) unicast frames targeted for another blade; 2) mulitcast frames targeted for other blades but not the present blade; and, 3) multicast frames targeted for other blades including the present blade. As shown in FIG. 11, at step 454, a determination is made as to which of the three categories the current frame applies. If it is determined that the frame is of category 1) and 2), i.e., a unicast frame targeted for another blade or a mulitcast frame targeted for another blade but not the present blade, then processing proceeds to step 456 where the frame is forwarded to a network processor switching fabric for dispatch to the destined blades on their egress side. Then, as indicated at step 458, the egress GFH of each blade processes the frame in accordance with the incoming loop flow depicted in FIG. 9. If at step 454, it is determined that the frame is of category 3), i.e., a multicast frame targeted for other blades including the present blade, then processing proceeds to step 460 where the frame is forwarded to a network processor switching fabric for dispatch to the destined blades including on their egress side, and including the egress side of the present blade. Then, as indicated at step 462, the egress GFH of each blade processes the frame in accordance with the incoming loop flow depicted in FIG. 9.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for controlling overall behavior of a network processor, implemented in a network node servicing a communications network, said system comprising:

said network node comprising a control point general purpose processor connected to control said network processor, wherein said network processor performs packet classification, queue/policy management and data packet forwarding, said network node including a control point subsystem for generating a guided control frame;

interface device located in said network processor for receiving said guided control frame including one or more control functions for configuring various functional devices within said network processor with device control parameter data;

means for forwarding said one or more control functions from a received control frame to a functional device within said network processor to be configured; and, processing means implemented in said device for executing control functions as specified in the control frame, whereby said device is controlled in accordance with said executed control functions and device control parameter data.

2. The system as claimed in claim 1, further including a processing mechanism for parsing a received frame and determining from said frame to which device said control frame is to be routed.

3. The system as claimed in claim 1, wherein said forwarding means including one or more data mover interfaces for receiving control frames from said control point subsystem destined for said network processor and, forwarding response frames generated by a device to be controlled back to said control point subsystem.

4. The system as claimed in claim 1, wherein said network processor includes an ingress side and egress side each capable of processing frames, said forwarding means including high speed links for forwarding frames between said ingress side and egress side.

5. The system as claimed in claim 1, wherein said network processor includes a control processor for generating guided control frames internal to said network processor, said forwarding means forwarding said control frames to said devices to be configured within said network processor.

6. The system as claimed in claim 4, wherein said network processor includes a wrap data mover interface for forwarding frames from an egress side to said ingress side within said network processor.

7. The system as claimed in claim 1, wherein said network node includes at least two network processors, a control frame received at a first network processor and including indication control function and device parameter data for controlling devices at an other network processor, said forwarding means including means for communicating said control frame to said other network processor from said first network processor.

8. The system as claimed in claim 7, wherein said means for communicating said control frame to said other network processor from said first network processor includes high speed data links.

9. The system as claimed in claim 3, further including mechanism for learning a location of said control point subsystem in said network node in an event a response frame is to be returned to said control point subsystem.

10. A data structure for a control frame to be communicated to a network processor device implemented in a network node including a control point subsystem for generating a guided control frame having said data structure for controlling overall behavior of said network processor, said data structure including:
   data for indicating a target location of said network processor within said network node comprising a control point general purpose processor connected to control said network processor, wherein said network processor performs packet classification, queue/policy management and data packet forwarding, said target location including an address location of said network processor;
   data including a target functional device operating within said network processor device; and,
   data including control functions and associated control parameters for configuring said target functional device operating in said target network processor, whereby a first network processor receiving said control frame forwards said control frame to said target network processor for configuring said functional device thereof with said control functions and associated control parameters.

11. The data structure as claimed in claim 10, further comprising:
   data for indicating whether a response control frame is required to be built when an error occurs during configuration of a functional device; and,
   data for indicating whether said frame is a request control frame or a response control frame.

12. The data structure as claimed in claim 10, further comprising data for indicating whether said control frame is destined to an ingress or egress side of said network processor.

13. The data structure as claimed in claim 11, said control frame further comprising data for indicating a source device to which response frames are to be sent.

14. The data structure as claimed in claim 13, wherein said control frame further comprises data for indicating whether a functional device to be configured from said control frame is to learn an address location of said control point system sourcing said control frame.

15. The data structure as claimed in claim 13, wherein said control functions and associated control parameters for configuring said target functional device are user configurable.

16. A method for controlling overall behavior of a network processor implemented in a network node comprising a control point general purpose processor connected to control said network processor, wherein said network processor performs packet classification, queue/policy management and data packet forwarding, said network node servicing a communications network said method comprising the steps of:
   controlling said network processor by said control point general purpose processor, said network processor performing packet classification, queue/policy management and data packet forwarding;
   generating a guided control frame by a control point subsystem;
   receiving said guided control frame including one or more control functions for configuring various functional devices within said network processor with device control parameter data;
   forwarding said one or more control functions from a received control frame to a functional device within said network processor to be configured; and,
   executing control functions as specified in the control frame to thereby configure said device, whereby said network processor is controlled in accordance with said executed control functions and device control parameter data.

17. The method as claimed in claim 16, further including the step of parsing a received frame and determining from said frame to which functional device said control frame is to be routed.

18. The method as claimed in claim 16, wherein said network processor device implements one or more data mover interfaces, said receiving step including receiving control frames from said control point subsystem destined for said network processor via a data mover interface.

19. The method as claimed in claim 18, wherein during the step of or in response to executing control functions as specified in the control frame, the steps of:
   building a response frame in said functional device within said network processor; and,
   forwarding said response frame back to said control point subsystem.

20. The method as claimed in claim 16, wherein said network processor includes an ingress side and egress side each capable of processing received frames, said forwarding step further including the step of forwarding frames between said ingress side and egress side via high speed data links.

21. The method as claimed in claim 16, wherein said network processor includes control processor device for generating said guided control frame, said forwarding step including the step of enqueuing said control frame for transmission to said devices to be configured within said network processor.

22. The method as claimed in claim 20, wherein said network processor includes a wrap data mover interface, said forwarding step further including the step of wrapping frames from said egress side to said ingress side via said wrap data mover interface.

23. The method as claimed in claim 16, wherein said network node includes at least two network processors, a control frame being received at a first network processor and including indication control function and device parameter data for controlling devices at an other network processor, said forwarding step further including the step of communicating said control frame to said other network processor from said first network processor.

24. The method as claimed in claim 23, wherein said communicating step is conducted via high speed data links.

25. The method as claimed in claim 19, wherein said step of building a response frame in said functional device further includes the step of learning a location of said control point subsystem in said network node environment in an event a response frame is to be returned to said control point subsystem.

* * * * *